(12) United States Patent
Lee et al.

(10) Patent No.: US 11,210,727 B2
(45) Date of Patent: Dec. 28, 2021

(54) SYSTEMS AND METHODS FOR MANAGING AND FACILITATING COMBINED PURCHASE OF ITEMS BY MULTIPLE CUSTOMERS

(71) Applicant: Toshiba Global Commerce Solutions Holdings Corporation, Tokyo (JP)

(72) Inventors: Yi-Sheng Lee, Research Triangle Park, NC (US); Te-Chia Tsai, Research Triangle Park, NC (US); Chih-Huang Wang, Research Triangle Park, NC (US); Hawaii Xuan, Research Triangle Park, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 245 days.

(21) Appl. No.: 16/298,579

(22) Filed: Mar. 11, 2019

(65) Prior Publication Data
US 2020/0294116 A1 Sep. 17, 2020

(51) Int. Cl.
*G06Q 30/06* (2012.01)
*G06F 9/54* (2006.01)
*G06Q 30/02* (2012.01)

(52) U.S. Cl.
CPC ......... *G06Q 30/0635* (2013.01); *G06F 9/542* (2013.01); *G06Q 30/0207* (2013.01); *G06Q 30/0605* (2013.01); *G06Q 30/0631* (2013.01); *G06Q 30/0641* (2013.01); *G06Q 30/0206* (2013.01); *G06Q 30/0222* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 8,140,402 B1 | 3/2012 | Mesaros | |
| 8,694,365 B2 * | 4/2014 | Jacob Sushil | G06Q 30/0207 705/14.1 |
| 9,031,860 B2 | 5/2015 | Winters et al. | |
| 10,621,638 B2 * | 4/2020 | D'Souza | G06Q 30/0605 |
| 2008/0082420 A1 | 4/2008 | Kargman et al. | |
| 2012/0179516 A1 | 7/2012 | Fakhrai et al. | |

(Continued)

FOREIGN PATENT DOCUMENTS

WO WO-2014088892 A1 * 6/2014 ......... G06Q 30/0611

OTHER PUBLICATIONS

Grofers, Group buying to contribute 25-30 pc of revenues in FY 19: Grofers, Indiaretailiing.com, dated Oct. 8, 2018. (Year: 2018).*

(Continued)

*Primary Examiner* — Mark A Fadok
(74) *Attorney, Agent, or Firm* — Olive Law Group, PLLC

(57) ABSTRACT

Systems and methods for managing and facilitating combined purchase of items by multiple customers are disclosed. According to an aspect, a method includes receiving, from a computing device, notification by a first user to purchase one or more items. The method also includes determining whether to match the first user with a second user for combined purchase of the one or more items. Further, the method includes associating the first user with the second user for combined purchase of the one or more items in response to determining that the first user matches the second user.

10 Claims, 4 Drawing Sheets

(56) References Cited

U.S. PATENT DOCUMENTS

| | | | |
|---|---|---|---|
| 2013/0006795 A1 | 1/2013 | Kahn | |
| 2013/0144689 A1* | 6/2013 | Phung | G06Q 30/0605 705/14.1 |
| 2013/0144746 A1* | 6/2013 | Phung | G06Q 50/08 705/26.4 |
| 2013/0166360 A1 | 6/2013 | Kshetramade et al. | |
| 2014/0297390 A1* | 10/2014 | Grindel | G06Q 30/0225 705/14.36 |
| 2014/0344093 A1 | 11/2014 | Du et al. | |
| 2016/0012501 A1 | 1/2016 | Ahmed | |
| 2016/0027078 A1* | 1/2016 | Mesaros | G06Q 30/06 705/26.2 |
| 2016/0189227 A1* | 6/2016 | Gandhi | G06Q 30/0261 705/14.58 |
| 2016/0343050 A1* | 11/2016 | D'Souza | G06Q 30/0605 |
| 2018/0114231 A1 | 4/2018 | Deluca et al. | |
| 2019/0114693 A1* | 4/2019 | Zhang | G06Q 30/0637 |

OTHER PUBLICATIONS

Chen, Tingyi, "Community Group Buy—the next billion dollar e-commerce industry", Walkthechat.com, Dated Mar. 11, 2019. (Year: 2019).*

Huang, Liqun, "Group Buying based incentive mechanism for mobile crowd sensing", IEEE, dated Jun. 27, 2016 (Year: 2016).*

Yung-Ming Li et al., 2014 "A social recommender mechanism for location-based group commerce" Information Sciences, Institute of Information Management, Taiwan, vol. 274, pp. 125-142.

* cited by examiner

SYSTEMS AND METHODS FOR MANAGING AND FACILITATING COMBINED PURCHASE OF ITEMS BY MULTIPLE CUSTOMERS

TECHNICAL FIELD

The presently disclosed subject matter relates generally to retail systems. Particularly, the presently disclosed subject matter relates to systems and methods for managing and facilitating combined purchase of items by multiple customers.

BACKGROUND

In retail environments, such as grocery stores and other "brick and mortar" stores, customers typically shop within a store and subsequently proceed to checkout for purchase of items at a point of sale (POS) terminal. The POS terminal may operate to conduct a self-checkout purchase transaction with the customer, or the POS terminal may operate to conduct a purchase transaction with the customer with assistance of store personnel. Such purchase transactions typically involve scanning a bar code of each item for purchase by the customer in order to calculate and display a total amount owed by the customer for the products. Subsequently, a purchase transaction for the customer may be completed after entry of payment information by the customer or store personnel.

In some instances, a sale may be available to customer if a particular quantity of the item is purchased. For example, breads in a bakery may be on sale and the sale may be available to customers up until the store closes for the day. Normally, the breads may be on sale for $1.00 each. The sale may be for 5 of the breads for $3.00. The customer may like to take advance of the discount; however, he or she may not want 5 of the breads. The customer would likely be happier if he or she could take some advantage of the sale but only get the desired number of breads. In view of such a scenario, it would be beneficial for a retailer to provide systems for a customer to take advantage of such promotions.

BRIEF DESCRIPTION OF THE DRAWINGS

Figure 1:
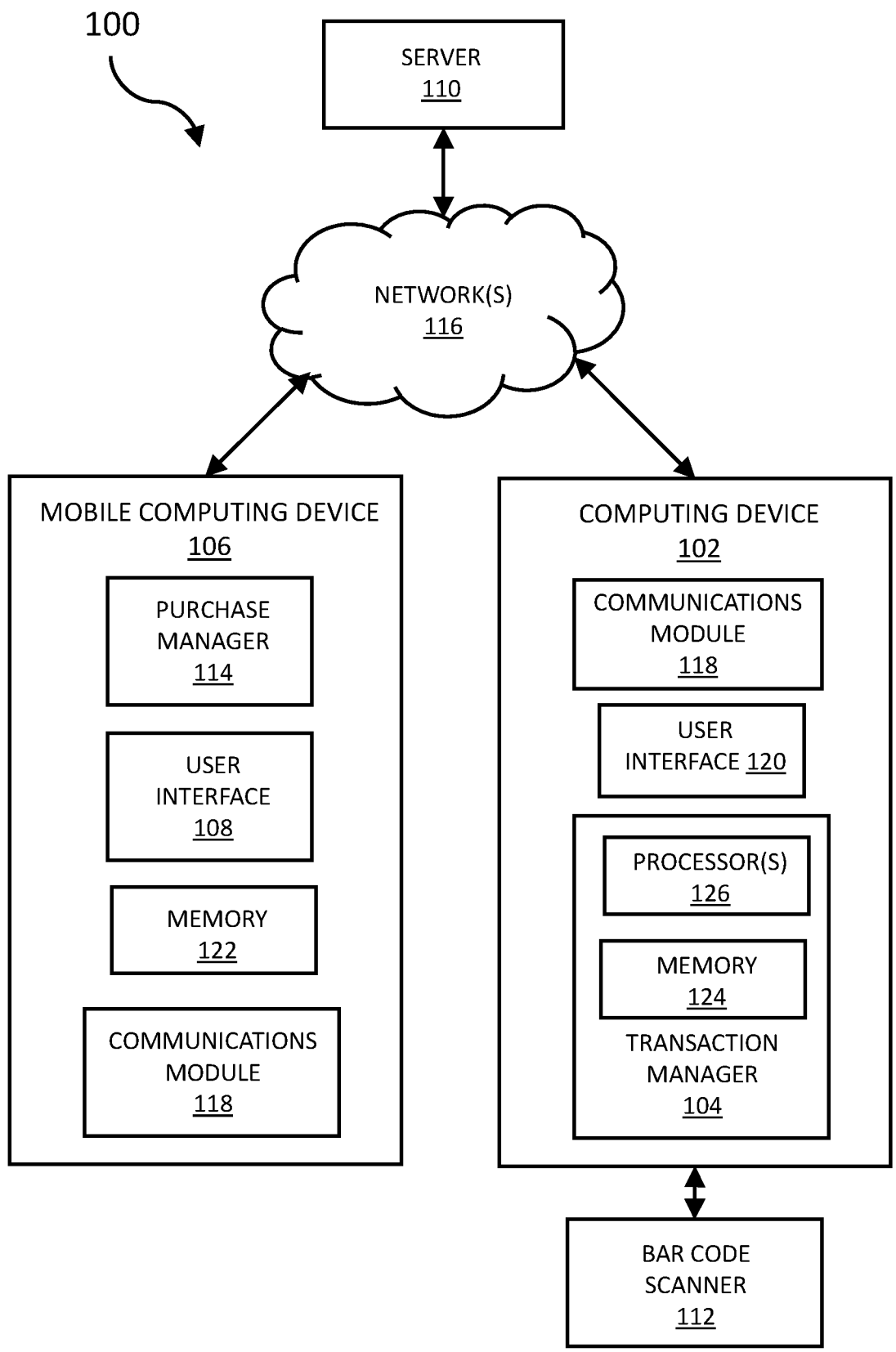
Figure 2:
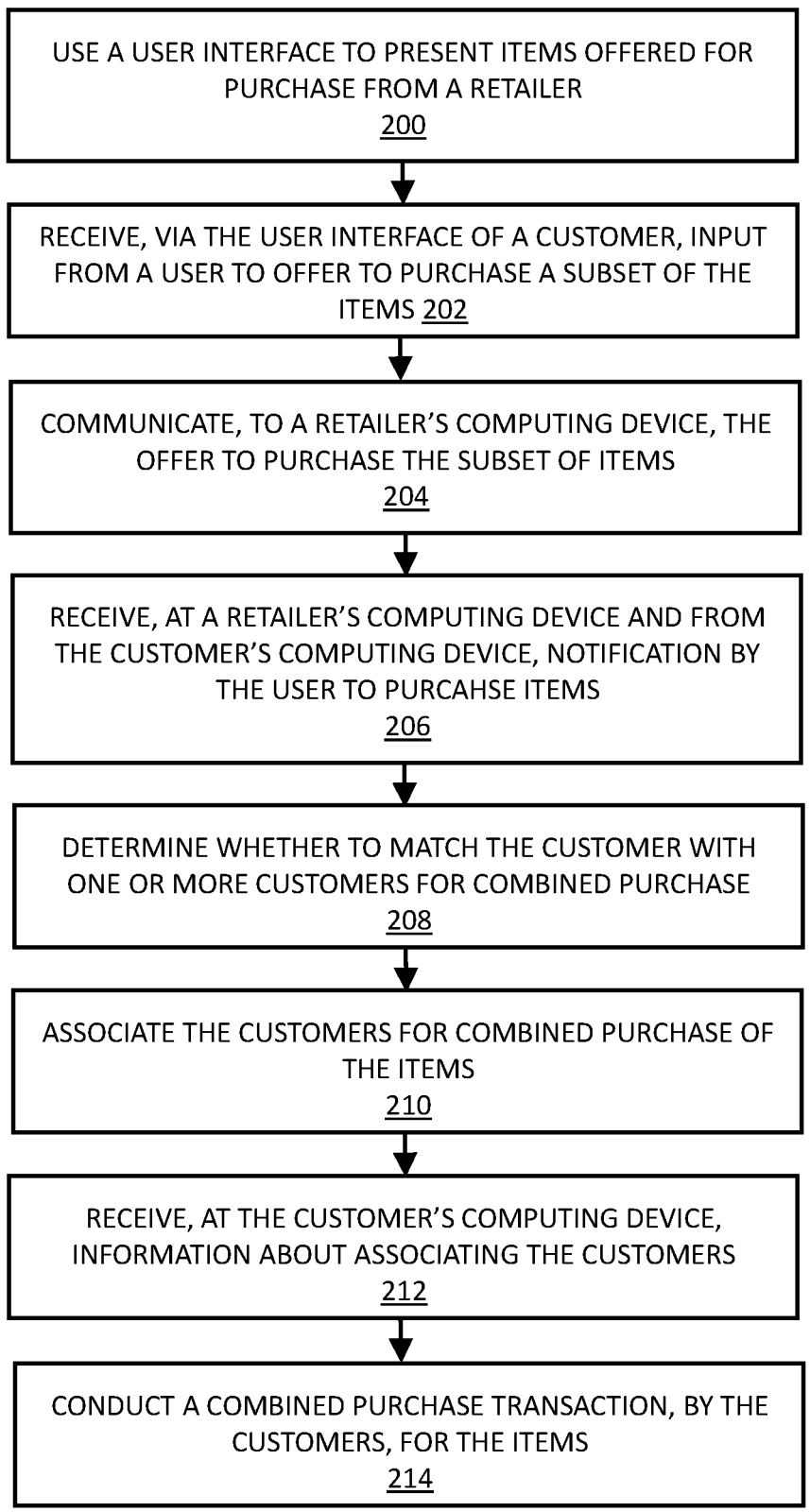
Figure 3:
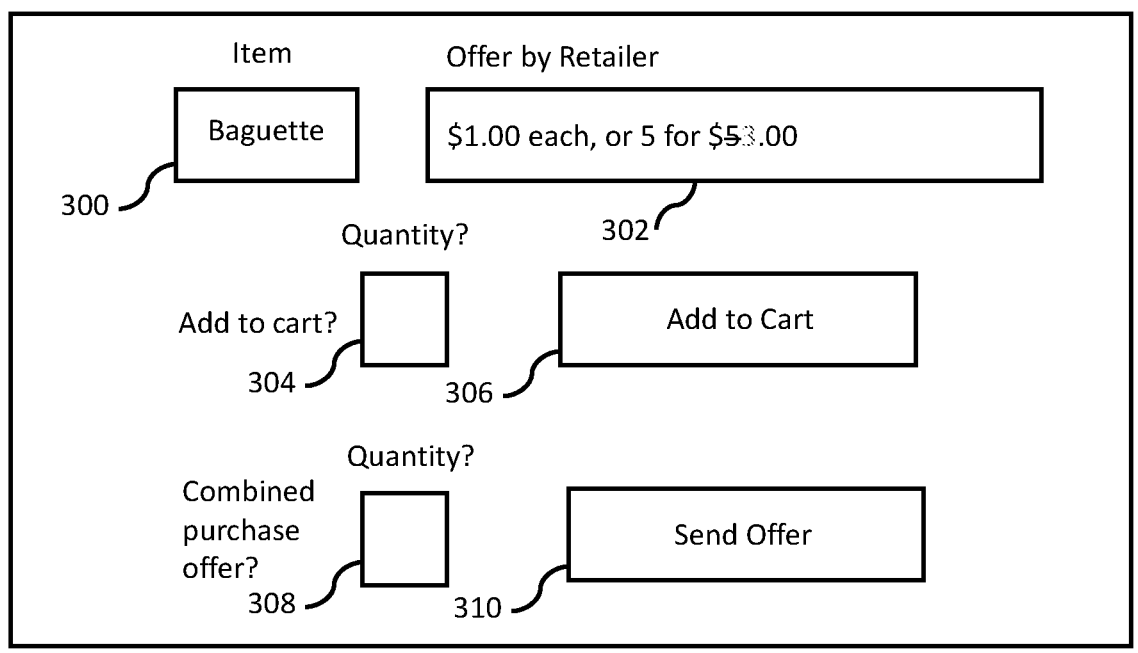
Figure 4:
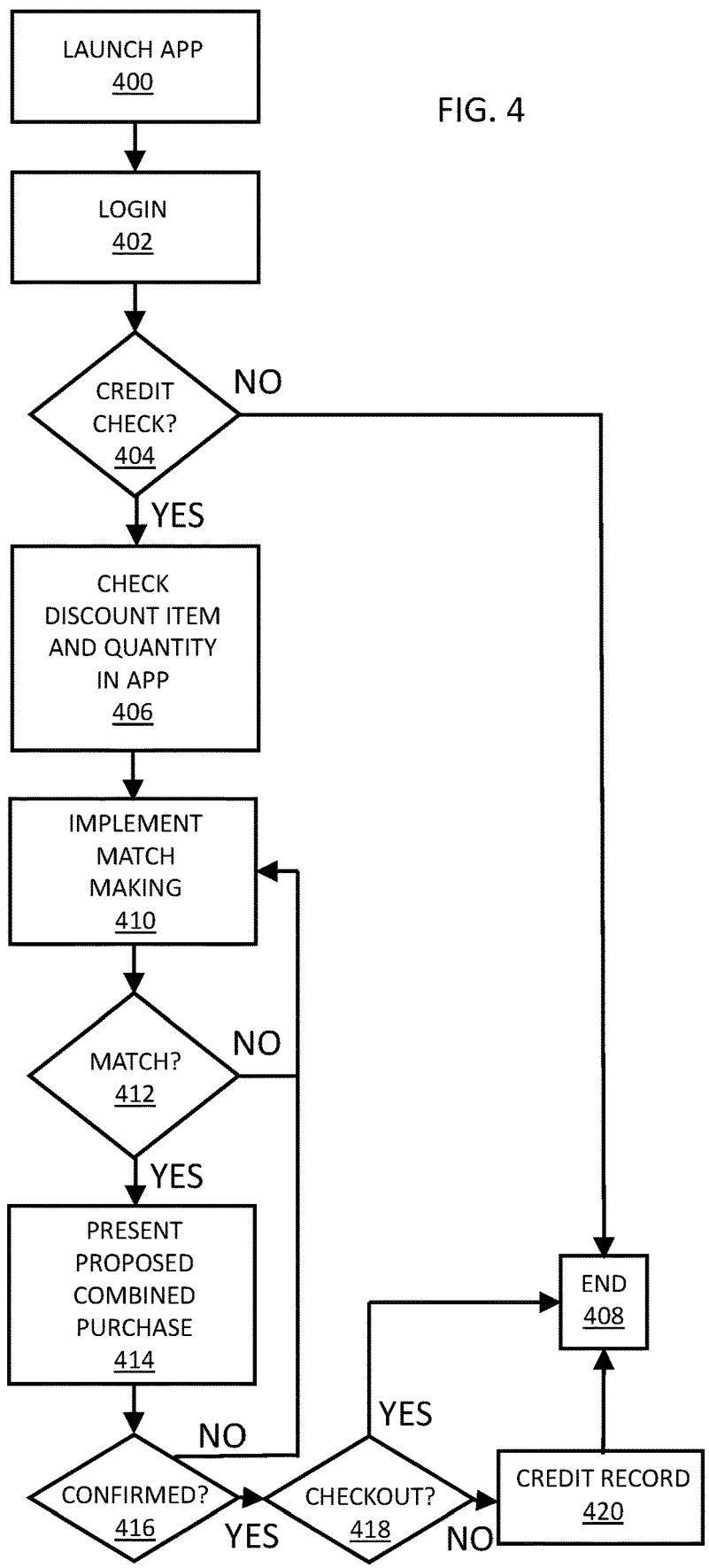

Having thus described the presently disclosed subject matter in general terms, reference will now be made to the accompanying Drawings, which are not necessarily drawn to scale, and wherein:

FIG. 1 is a block diagram of an example system for managing and facilitating combined purchase of items by multiple customers in accordance with embodiments of the present disclosure;

FIG. 2 is a flow chart of an example method of managing and facilitating combined purchase of items by multiple customers in accordance with embodiments of the present disclosure;

FIG. 3 is an image of an example display screen showing items, their descriptions, purchase price, and the special sale price or discount for items in accordance with embodiments of the present disclosure; and FIG. 4 illustrates a flow chart of another example method of managing and facilitating combined purchase of items by multiple customers in accordance with embodiments of the present disclosure.

SUMMARY

The presently disclosed subject matter includes systems and methods for managing and facilitating combined purchase of items by multiple customers. According to an aspect, a method includes receiving, from a computing device, notification by a first user to purchase one or more items. The method also includes determining whether to match the first user with one or more other users for combined purchase of the one or more items. Further, the method includes associating the first user with the other user(s) for combined purchase of the one or more items in response to determining that the first user matches the second user.

According to another aspect, a method is implemented at a computing device having a user interface. The method includes using the user interface to present a plurality of items offered for purchase from a retailer. The method also includes receiving, via the user interface, input from a first user an offer to purchase a subset of the items. Further, the method includes communicating, to one or more other computing devices, the offer to purchase the subset of items. The method also includes receiving, from the other computing device(s), information about associating the first user with one or more other users for combined purchase of the items.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The presently disclosed subject matter is now described in more detail. For example, FIG. 1 illustrates a block diagram of an example system for managing and facilitating combined purchase of items by multiple customers in accordance with embodiments of the present disclosure. Referring to FIG. 1, the system 100 may be implemented in whole or in part in any suitable environment for conducting purchase transactions. For example, the system 100 may be implemented in a retail store having a variety of items for purchase. In another example, the system 100 may be suitably implemented, at least partially, in an online retail service environment. Functionality described herein may be implemented by suitable hardware, software, firmware, or combinations thereof.

The system 100 includes a computing device 102 including a transaction manager 104 configured to manage and facilitate combined purchase of items by multiple customers. The transaction manager 104 may include suitable hardware, software, firmware, or combinations thereof for implementing its functionality. More particularly, the transaction manager 104 may be configured to receive, from another computing device, notification by a user to purchase one or more items. The transaction manager 104 may be configured to determine whether to match the user with another user for combined purchase of the one or more items. Further, the transaction manager 104 may be configured to associate the users for combined purchase of the item(s) in response to determining that the users match. Additional details and examples of these functions of the transaction manager 104 are described herein.

In an example of the operation of the transaction manager 104, a mobile computing device 106 (e.g., a smartphone or tablet computer) may present to its user multiple items offered for purchase from a retailer. For example, the retailer may be offering the items for purchase at a "brick and mortar" retail store in which the computing device 106 is located. The computing device 106 may include a user interface 108 that is configured to present the items that are being offered by the retailer. In an example, a customer of the retail store may access an application (or "app") on the computing device, and the app may present the items with graphics (e.g., images of the items) and/or by text. In addition, the app residing on the computing device 106 may present a purchase price and/or discount for the items individually or if a particular quantity of the items are purchased (i.e., a discount for the items if a particular quantity or number of the items are purchased).

Alternative or in addition to use of an app, the computing device 106 may use a web browser of the computing device 106 to access a website of the retailer, and the website may similarly present items available for sale and discounts available if a particular quantity of the items are purchased. The retailer may own and operate the website. In the examples provided herein, an app or website may be described, but it should be understood that similar or the same functionality and use by the customer or retailer may be made available by each.

In an example of offering a discount for an item, an app residing on the computing device 106 and/or a website accessed by the computing device may present to a customer in a retail store multiple different items available for purchase in a retail store. In this example, the retail store is a grocery store having, for example, produce, canned goods, cereals, meats, household items, etc. available for purchase by the customer. The user interface 108 may include a touchscreen display that can present information and/or graphics about the items available for purchase. For example, the touchscreen display may display a list of the items that include, for each item, the item's name (or other identification), an image of the item, a description of the item, and a price for the item. In the case of apples for example, names may include "Red Delicious," "Granny Smith," and "Fuji". Continuing this example, a description may include nutrition information and indicate whether the apple is certified organic. Further in this example, a price for an amount of the apple can provided, such as if the apples are bought individually or in a prepackaged bag.

Customers may use the app or website to initiate a purchase transaction for purchase of items selected in the retail store. As described, the app or website may present items available for purchase in the retail store. The customer may use the user interface 108 for selecting the items to place in a "grocery cart" or "cart". These same items may subsequently be carried by hand or in a basket or actual grocery cart to a checkout area of the retail store. The customer may, at the checkout area, conduct a purchase transaction for purchase of the selected items. In the example of FIG. 1, the computing device 102 may be a POS terminal operable to conduct a purchase transaction for the selected items. Information about the selected items may be stored at the POS terminal or a remote server, such as server 110 which may be owned and operated by the retailer. In any case, the customer may provide customer account identification at the POS terminal, and the POS terminal may access information about the selected items based on the customer account identification. In this way, the customer may be provided with more convenient and efficient checkout at the POS terminal, because it is not necessary to scan (e.g., with a bar code scanner 112 of the computing device 102) or otherwise enter identification of the selected items for purchase at the POS terminal. Once the items are identified at the POS terminal and verified as being those carried by the customer for purchase, the POS terminal may be used by either a cashier or the customer for completing the purchase transaction for purchase of the items.

In accordance with embodiments, the computing device 106 may include a purchase manager 114 configured to manage purchases of items by a user. In examples, the purchase manager 114 may be an app or module residing on the computing device 106 for managing and conducting purchases as disclosed herein. For example, the purchase manager 114 may be hardware, software, firmware, or combinations thereof for implementing the functionality described herein. In a particular example, the purchase manager 114 may be implemented by memory and one or more processors of the computing device 106.

In embodiments of operation of the purchase manager 114, the purchase manager 114 may use the user interface 108 to present multiple items offered for purchase from a retailer. For example, the user interface 108 may include a touchscreen display that displays information about a particular item and its price if the item is purchased individually. In addition, the user interface 108 may be controlled by the purchase manager 114 to present a price for the item if a particular quantity of the item is purchased. This item and purchase information may be communicated to the computing device 106 via one or more networks 116, such as the Internet and/or wired or wireless networks. The computing devices 102 and 106 may communicate with the network(s) 116 via respective communication modules 118. The item and purchase information may be received by the purchase manager 114 and stored in memory 122.

Subsequent to presentation of the items for purchase and pricing information, the customer may consider whether it is desired to purchase the items at the offered price. For example, bread in a bakery section of a grocery store may discount bread and offer a sale available to customers before close of the store for the day. The bread may be available at $1.00 each if purchased individually, but also the bread may be available at $3.00 for 5. Thus, the customer is offered a discount for the bread if purchased at a particular quantity, which is 5 in this example. In other examples, items may be offered at a sale price or discount at other quantities if the same type of item is purchased at the specified quantity. In still other examples, a sale price or discount may be offered if particular types of items are purchased in particular quantities. This information about the item, the quantity, and the price may be entered in a user interface 120 of the computing device 102, received by the transaction module 104, and stored in memory 124. The computing device 102 may also include one or more processors 126. Alternatively, such information may be entered in the server 110, which may reside in a back office of the retail store.

Continuing the example, the purchase manager 114 may receive the information about the item, the quantity, and the price and subsequently present the information to the customer via the user interface 108. Subsequently and upon deciding to purchase the item at the presented quantity and price, the customer may use the user interface 108 to input an offer to purchase all or a subset of the items. In the aforementioned example of the bread, the customer may desire only 2 of the bread. In this example, it would not be beneficial for the customer to pay for 5 of the bread, because he or she would pay additional for unwanted bread. In order to receive a discount on the purchase of only 2 of the bread, the customer may utilize the purchase manager 114 in accordance with embodiments of the present disclosure to submit an offer to buy the subset of 2 of the bread. This offer may subsequently be communicated to the transaction manager 104 of the computing device 102 in order to match the customer with another customer for taking advantage of the discount of 5 breads for $3.00. In response to finding another customer interested in such a combined purchase, the transaction manager 104 may match the customers and facilitate associating the customers for combined purchase of the items.

It is noted that although 2 customers are described by examples herein, the systems and methods described herein may also be applied to more than 2 customers. For example, if a discount applies to 10 units, it may be purchase by two or more customers associated together for purchasing as described herein. One user may obtain 2 units, another user may obtain 3 units, and another customer may obtain 5 units. Therefore, in this example, the combination of the 3 units purchasing the 10 units together may make the discount apply.

A detailed example method of managing and facilitating combined purchase of items by multiple customers is described with respect to FIG. 2, which illustrates a flow chart of the method. The method of FIG. 2 is described as being implemented by the system 100 shown in FIG. 1, although it should be understood that the method may be implemented by any other suitable system. Particularly, for example, the steps of FIG. 2 are described by this example as being implemented by multiple, mobile computing devices and a POS terminal in a retail store. In the alternative, the method may be implemented by any suitable types of computing devices in any suitable type of retail environment, such as online shopping via the Internet.

The method of FIG. 2 includes using 200 a user interface of a computing device to present items offered for purchase from a retailer. For example, the purchase manager 114 may be an app residing on the computing device 106 that the customer may use to manage the selection and purchase of items available in a retail store. Upon entering the retail store, the customer may use the computing device 106 to open the app to engage the purchase manager 114. The purchase manager 114 may request and receive, from the computing device 102, a listing of items available for purchase in the retail store. In reply to the request, the transaction manager 104 may access memory 126 to retrieve the items available for sale in the retail store, their descriptions, purchase price, and a special sale price or discount for items if a particular quantity of the items is purchased. This information may be communicated to the computing device 106 and also to other computing devices. Upon receipt of the information, the purchase manager 114 may control the user interface to present the items, their descriptions, purchase price, and the special sale price or discount for items. For example, graphics and/or text of this information may be displayed by a display of the user interface 108.

FIG. 3 is an image of an example display screen showing items, their descriptions, purchase price, and the special sale price or discount for items in accordance with embodiments of the present disclosure. The display screen of FIG. 3 may be displayed by the computing device 106 and shows the aforementioned example of a retailer offering bread individually for $1.00 and a quantity of 5 of the bread offered for $3.00. Referring to FIG. 3, the display screen indicates in text box 300 that the item for sale is a baguette. Also, the offer by the retailer is indicated in text box 302. To purchase the baguette with initiating a combined purchase transaction, the customer may enter the quantity at text box 304 and subsequently select the "Add to Cart" button 306. This selection may subsequently be entered into a checkout cart for the customer. Alternatively, to purchase the baguette and try to combine the purchase with another, the customer may enter the quantity at text box 308 and subsequently select the "Add to Cart" button 310. This selection may subsequently be managed by the transaction manager 104 for combining the purchase of the 5 baguettes for $5.00 with another customer.

The method of FIG. 2 includes receiving 202, via the user interface, input from the user to offer to purchase a subset of the items. Continuing the aforementioned example, the customer using the computing device 106 may input into the user interface 108 that 2 of the bread is desired for purchase. Referring to the example of FIG. 3, the customer may enter a quantity of 2 in text box 308 and then select button 310.

The method of FIG. 2 includes communicating 204, to a retailer's computing device, the offer to purchase the subset of items. Continuing the aforementioned example, the purchase manager 114 may receive the input and communicate the quantity and type of item to the computing device 102.

The method of FIG. 2 includes receiving 206, at the retailer's computing device and from the customer's computing device, notification by the user to purchase items. Continuing the aforementioned example, the computing device 102 may receive the quantity and type of item information from the computing device 102. In this example, the notification may be that the customer would like to buy 2 of the bread in a combined purchase with another customer to take advantage of the discounted price of 5 breads for $3.00. The transaction manager 104 of the computing device 102 may receive the notification.

The method of FIG. 2 includes determining 208, at the retailer's computing device, whether to match the customer with one or more other customers for combined purchase of the items. Continuing the aforementioned example, the transaction manager 104 may determine whether to match the customer using mobile computing device 106 with one or more other customers for combined purchase of the items. For example, the transaction manager 104 may determine whether another customer is available match with for taking advantage of the discount of 5 breads for $3.00. In response to finding another customer interested in such a combined purchase, the transaction manager 104 may match the customers and facilitate associating the customers for combined purchase of the items.

The method of FIG. 2 includes associating 210 the customers for combined purchase of the items in response to matching the customers. Continuing the aforementioned example, the transaction manager 104 may associate the customers in response to determining that the customers together would like to purchase the breads together.

The method of FIG. 2 includes receiving 212, from the retailer's computing device, information about associating the customers for combined purchase of the items. Continuing the aforementioned example, the transaction manager 104 may send to the computing device 106 verification that the other customer was matched for purchase of the breads. The computing device 106 may receive the verification along with information about proceeding to checkout for purchase of the subset of breads at the customer's portion of the discounted price. Further, the method of FIG. 2 includes conducting 214 a combined purchase transaction, by the customers, for the items. In an example, this combined purchase transaction may be implemented at a POS terminal. In an example, customer A may buy 2 breads and the customer B may buy 3 breads. As a result, customers A and B have a combined offer to buy 5 breads at the discount. In order to complete the purchase for the discount, the customers can show a display of the application that shows a bar code that can let the POS terminal identify these goods as having been discounted.

In accordance with embodiments, the systems and methods described herein may be implemented by a retail store kiosk. For example, the functionalities of the transaction manager 104 and the purchase manager 114 may be combined in a single computing device, such as a kiosk.

FIG. 4 illustrates a flow chart of another example method of managing and facilitating combined purchase of items by multiple customers in accordance with embodiments of the present disclosure. The method of FIG. 4 is described as being implemented by the system 100 shown in FIG. 1, although it should be understood that the method may be implemented by any other suitable system.

Referring to FIG. 4, the method includes launching 400 an app. For example, the purchase manager 114 of the mobile computing device 106 may launch an app provided by a retailer. Further, the method includes logging 402 into the customer's account on the app with the retailer. Continuing the example, the customer may interact with the user interface 108 to login with credentials such as login ID (e.g., email address) and password.

The method of FIG. 4 includes determining 404 whether a credit check is approved. In response to the credit check being approved, the method may proceed to step 406. In response to the credit check not being approved, the method may proceed to and end at step 408. Continuing the aforementioned example, the app can communicate with the computing device 102 to determine whether the customer's credit record meets credit criteria. As an example, a check of at least 3 times may be performed. If the customer's credit fails the set number of times (e.g., 3), then there is a fail, the customer may be informed by the user interface 108, and the method can proceed to step 408. In an example, a credit record for a customer may be managed that indicates whether the customer proceeds with purchases after a match is made. The credit record may be maintained a network (e.g., server). If the customer does not buy those items that match, then this may be noted in the credit record for the customer and can be unfavorable indicator. The credit check may occur at a server or mobile device (e.g., computing devices shown in FIG. 1).

At step 406 of FIG. 4, the method includes checking the discount item and quantity in the app. Continuing the aforementioned example, the app may present promotions or discounted items, such as a discount if a minimum quantity or set quantity is purchased. As an example, when a user logs in the app, the app may obtain discount information from the computing device 102 (e.g., server) and this information may be presented to the user. The user can select the items and the quantity in the app then the app send the selections detail to the server for match making.

The method of FIG. 4 includes implementing 410 a match making process by the retailer's computing device. Continuing the aforementioned example, the retail store may require pre-setup of all the promotions or discount items. In an example, the app can receive the user's selections, and subsequently the computing device 106 may send the selections to the computing device 102. The computing device 102 may perform the match making and subsequently send the result to the user's app on the computing device 106. It is noted that match making may be performed on either computing device 102 or 106, by both, or by another computing device. The app may gather information for match making, such as store location and corresponding customers with the same selections.

The method of FIG. 4 includes determining 412 whether there is a match with another customer. Continuing the aforementioned example, the transaction manager 104 may compare the selection of item and quantity of the customer of mobile computing device 106 with selections of other customers to determine whether there is a match for combined purchase of an item. If no match is found, the method may return to step 410. If a match is found, the method may proceed to step 414.

At step 414 of FIG. 4, the method includes presenting the proposed combined purchase. Continuing the aforementioned example, the transaction manager 104 may control the computing device 102 to send to the customer's mobile computing device 106 a proposed combined purchase of the selected items with another customer. The app on the computing device 102 may control the user interface 108 to present the proposed combined purchase, such as by use of a display of the computing device 102. Subsequently, the method proceeds to step 416 where the customer can be asked to confirm the combined purchase. For example, the purchase manager 114 can control the user interface 108 to display a query to confirm and to input whether or not it is confirmed. If not confirmed by the customer or there is a timeout with no indication by the customer, the method may proceed to step 410. If confirmed by the customer within the set timeout period, the method may proceed to step 418 for checkout.

At step 418 of FIG. 4, the customer will be asked and provided with steps to finish the purchase transaction. After checkout, the method may proceed to step 408. Otherwise at step 420, if the customer does not proceed with the checkout, the matched goods will be counted in the credit record for the customer. Subsequently, the method may end at step 408. Upon checkout, a combined purchase between the two customers may be implemented in accordance with embodiments of the present disclosure. The matched items can be counted as a discount price. For un-matched items, the app can close all of them once the app detects the customer is out of the store or checked out.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
   receiving, from a first computing device and a second computing device, data indicative of a geographic location of the first computing device and data indicative of a geographic location of a second computing device, respectively;
   receiving, from the first computing device, notification by a first user to purchase an item within a retail environment, the notification including a first identifier of the item and a first quantity of the item;
   receiving, from the second computing device, a second identifier of an item and a second quantity of the item that a second user is interested in purchasing within the retail environment;
   determining that the first identifier matches the second identifier in association for a combined purchase transaction;
   in response to determining that the first identifier does not match the second identifier, preventing execution of a combined purchase of the first quantity of the item and the second quantity of the item by the first and second computing devices;
   determining that the geographic locations of the first and second computing devices are within the retail environment based on the received data; and
   in response to determining that the first identifier matches the second identifier and that the geographic locations of the first and second computing devices are within the retail environment, executing a combined purchase of the first quantity of the item by the first computing device and the second quantity of the item by the second computing device.

2. The method of claim 1, further comprising communicating, to the first computing device of the first user, notification that the item is offered at discount.

3. The method of claim 2, wherein communicating notification that the item is offered at discount comprises communicating, to the first computing device of the first user, indication of a type of item, a quantity of the item, and a purchase price for the item at the indicated quantity.

4. The method of claim 2, wherein receiving notification by the first user comprises receiving acceptance of the offered discount at less than the indicated quantity,
   wherein the method further comprises determining that the second user is willing to purchase, together with the first user, a remainder of the indicated quantity of the item that the first user did not want to purchase, and
   wherein executing a combined purchase comprises conducting the combined purchase transaction for the item at the indicated quantity and based on the discount.

5. A method comprising:
at a first computing device comprising a user interface:
using the user interface to present a plurality of items offered for purchase from a retailer within a retail environment;
receiving, via the user interface, input from a first user an offer to purchase a subset of the items within the retail environment;
communicating, to a second computing device of a second user, the offer to purchase the subset of items and data indicative of a geographic location of the first computing device and a first identifier of the items; and
receiving, from the second computing device, information about associating the first user with the second user for combined purchase of the items; and
at a third computing device:
receiving, from the second computing device, a second identifier of items and data indicative of a geographic location of the second computing device;
determining a match of the first user and the second user based on the first identifier matching the second identifier in association for a combined purchase transaction;
in response to determining that the first identifier does not match the second identifier, preventing execution of a combined purchase of the first quantity of the item and the second quantity of the item by the first and second computing devices;
determining that the geographic locations of the first and second computing devices are within the retail environment based on the received data; and
in response to determining that the first identifier matches the second identifier and that the geographic locations of the first and second computing devices are within the retail environment, executing a combined purchase of the first quantity of the item by the first computing device and the second quantity of the item by the second computing device.

6. The method of claim 5, further comprising receiving, at the first computing device and from the second computing device, identification of the items.

7. The method of claim 5, further comprising using the user interface to present information about a discount that the items are offered for purchase.

8. The method of claim 7, further comprising presenting, at the first computing device, indication of a type of item, a quantity of the item, and a purchase price for the item at the indicated quantity.

9. The method of claim 8, further comprising receiving, at the first computing device via the user interface, an indication of the subset of the items for purchase.

10. A system comprising:
a transaction manager configured to:
receive, from a first computing device and a second computing device, data indicative of a geographic location of the first computing device and data indicative of a geographic location of a second computing device, respectively;
receive, from the first computing device, notification by a first user to purchase an item within the retail environment, the notification including a first identifier of the item and a first quantity of the item;
receive, from the second computing device, a second identifier of an item and a second quantity of the item that a second user is interested in purchasing within the retail environment;
determine that the first identifier matches the second identifier in association for a combined purchase transaction;
prevent execution of a combined purchase of the first quantity of the item and the second quantity of the item by the first and second computing devices in response to determining that the first identifier does not match the second identifier;
determine that the geographic locations of the first and second computing devices are within the retail environment based on the received data; and
control a point of sale (POS) terminal to execute a combined purchase of the first quantity of the item by the first computing device and the second quantity of the item by the second computing device in response to determining that the first identifier matches the second identifier and that the geographic locations of the first and second computing devices are within the retail environment.

* * * * *